United States Patent [19]

Akiyama et al.

[11] Patent Number: 5,396,829
[45] Date of Patent: Mar. 14, 1995

[54] APPARATUS FOR MULTIPLE LAYER TUBULAR BRAIDING

[75] Inventors: Yasuo Akiyama, Kyoto; Zenichiro Maekawa, Amagasaki; Hiroyuki Hamada, Shiga; Atsushi Yokoyama, Tsu, all of Japan

[73] Assignee: Murata Kikai Kabushiki Kaisha, Kyowa, Japan

[21] Appl. No.: 59,122

[22] Filed: May 7, 1993

Related U.S. Application Data

[63] Continuation-in-part of Ser. No. 10,448, Jan. 25, 1993, Pat. No. 5,287,790, which is a continuation of Ser. No. 694,385, May 1, 1991, abandoned.

[30] Foreign Application Priority Data

May 11, 1990 [JP] Japan ................................ 2-49371 U
Aug. 29, 1990 [JP] Japan ................................ 2-227079

[51] Int. Cl.$^6$ ................................................ D04C 3/06
[52] U.S. Cl. ................................................ 87/29; 87/33
[58] Field of Search .................. 87/5, 6, 7, 8, 9, 11, 87/28, 29, 30, 33, 50

[56] References Cited

U.S. PATENT DOCUMENTS

| 1,104,777 | 7/1914 | Cobb | 87/9 |
|---|---|---|---|
| 1,104,778 | 7/1914 | Cobb | 87/9 |
| 1,891,211 | 12/1932 | Blaisdell | 87/6 |
| 2,788,700 | 4/1957 | Crossley et al. | 87/50 |
| 4,256,011 | 3/1981 | Kozlowski | 87/6 |

FOREIGN PATENT DOCUMENTS

| 4114775 | 11/1991 | Germany | 87/11 |
|---|---|---|---|
| 17621 | of 1908 | United Kingdom | 87/29 |

Primary Examiner—Joseph J. Hail, III
Attorney, Agent, or Firm—Spensley Horn Jubas & Lubitz

[57] ABSTRACT

Multi-layer tubular braided structures are produced by apparatus including a plurality of generally concentric pairs of serpentine, intersecting bobbin carrier-guiding tracks. A bobbin carrier driving gear group is associated with each pair of tracks, adjacent gear groups meshing at a plurality of bobbin carrier crossover points. According to the method, multi-layer tubular braided structures are produced by circulating a first group of bobbin carriers exclusively along one track of a first pair of tracks, circulating a second group of bobbin carriers exclusively along one track of a second pair of tracks, and circulating at least one other group of bobbin carriers exclusively along at least portions of the other tracks of said pairs of tracks via the crossover points.

1 Claim, 6 Drawing Sheets

APPARATUS FOR MULTIPLE LAYER TUBULAR BRAIDING

CROSS REFERENCES TO RELATED APPLICATIONS

This application is a continuation-in-part of application Ser. No. 08/010,448, filed Jan. 25, 1993, now U.S. Pat. No. 5,287,790, which is a continuation of application Ser. No. 07/694,385, filed May 1, 1991, now abandoned.

BACKGROUND OF THE INVENTION

1. Field of the Invention

This invention relates to a method and apparatus for producing multi-layer tubular braids.

2. Description of the Prior Art

Single wall tubular braids are the predominant braided structures manufactured by conventional braiding machines. Existing machines can also produce belt or flat braids but few modifications beyond these shapes have been made.

In the flat-braiding machine, the serpentine, intersecting pairs of tracks in the track-defining plate are arranged along a circular path that is partially open, whereas in a braiding machine for producing tubular braids the circular track paths are completely closed. An example of a braiding machine that may be selectively utilized either as a tubular braider or as a flat braider is disclosed in U.S. Pat. No. 2,148,164.

Conventional braiding machines, however, cannot produce multi-layer tubular braided structures. Such structures would have applications beyond merely use as fiber-reinforcing plastic cores.

SUMMARY OF THE INVENTION

The object of the present invention is to provide a method and an apparatus for braiding multi-layer tubular braids and to thereby broaden the field of use of fiber-reinforcing reinforcing plastics using tubular braided structures.

Pursuant to a first embodiment of an apparatus in accordance with the present invention, there is provided means, such as a plate, for defining a plurality of generally concentric pairs of serpentine, intersecting bobbin carrier guiding tracks. A bobbin carrier driving gear group is operatively associated with each pair of tracks and adjacent gear groups mesh at a plurality of bobbin crossover points. By way of example, two pairs of tracks may be provided, the corresponding driving gear groups meshing at four equally spaced crossover points. Alternatively, three pairs of tracks may be provided, the corresponding driving gear groups meshing at four equally spaced crossover points between adjacent pairs of tracks.

In accordance with an example of a method according to the invention for forming multi-layer tubular braided structures, a first group of bobbin carriers is circulated exclusively along one track of a first pair of intersecting tracks arranged along a first closed, substantially circular path. A second group of bobbin carriers is exclusively circulated along one track of a second pair of intersecting tracks arranged along a second closed, substantially circular path generally concentric with the first circular path. At least one other group of bobbin carriers is circulated exclusively along at least portions of the other tracks of the first and second pairs of intersecting tracks by means of crossover points connecting the first and second pairs of tracks.

BRIEF DESCRIPTION OF THE DRAWINGS

Further objects, advantages and features of the invention will become apparent from the Detailed Description, below, when read in conjunction with the accompanying drawings in which.

DETAILED DESCRIPTION OF THE PREFERRED EMBODIMENTS

A braiding machine incorporating the present invention is basically similar to ordinary braiding machines for flat and tubular braided structures in that the braiding takes place by means of a plurality of groups of bobbin carriers intertwined in either a clockwise circular direction or a counterclockwise circular direction along the tracks formed in a track-defining plate. The braid is formed when each bundle of fibers, unwound from each bobbin onto its respective bobbin carrier, is introduced into a gathering guide positioned above the central section of the tracks. While rotating, the bobbin carrier is advanced along its path by the drive gears under the track-defining plate. Further, by changing the gear ratio, it is possible to change the speed of the bobbin carrier's movement and the speed of the winding of the braid and accordingly, to manufacture a braid having different angular fiber bundles.

Figure 1:
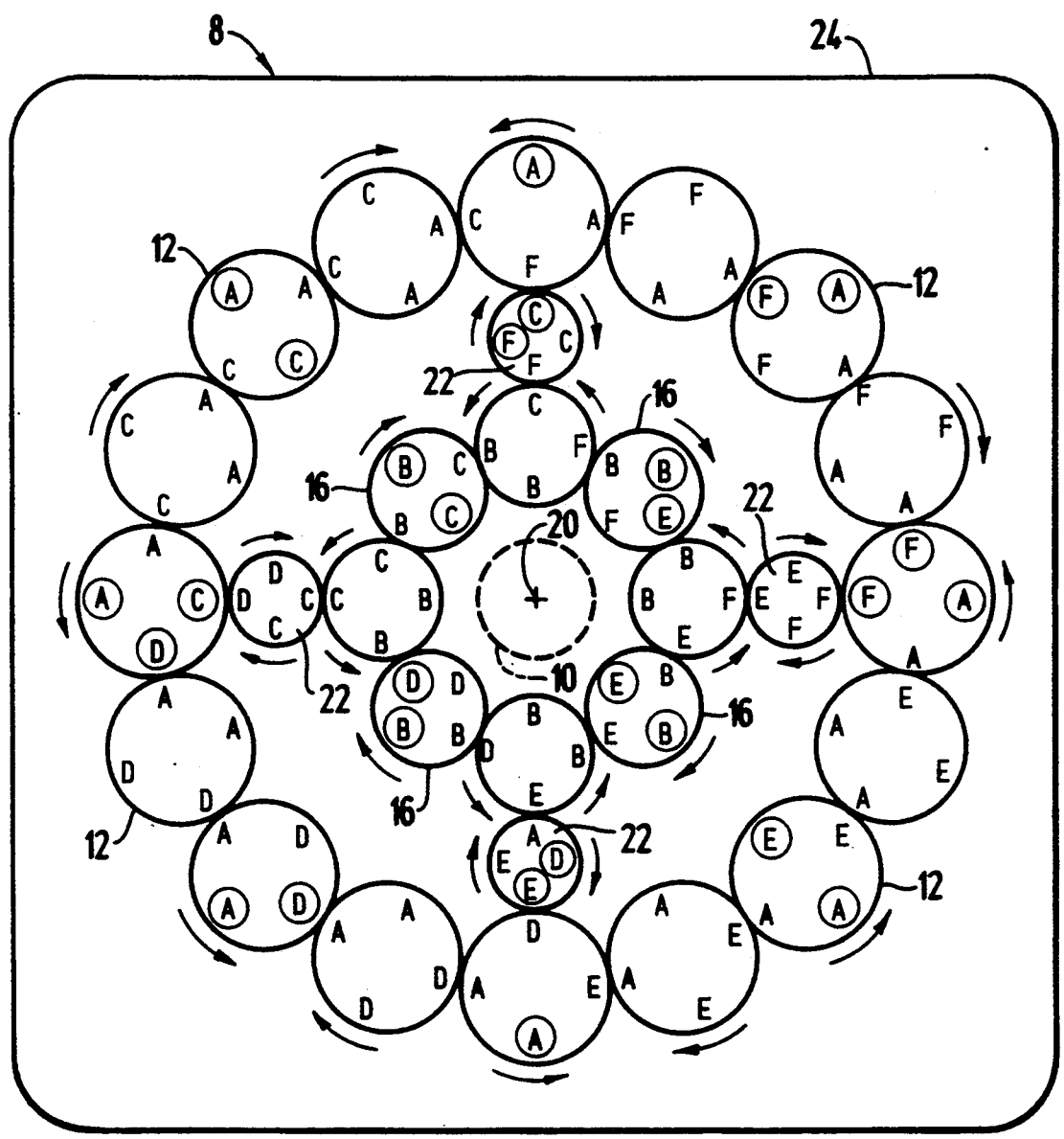
FIG. 1 is a plan view of a portion of a braiding apparatus showing the layout of bobbin carrier driving gears in accordance with a first embodiment of the invention.
Figure 2:
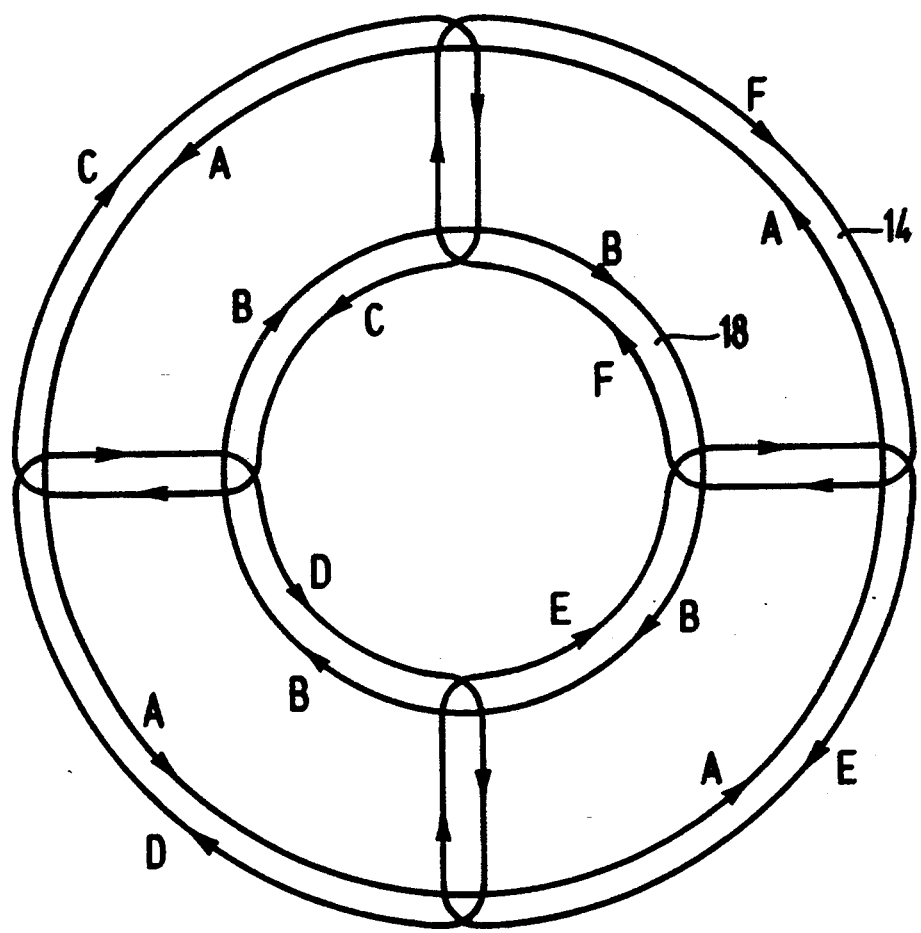
FIG. 2 is a schematic diagram of the nominal paths followed by the bobbin carriers driven by the gears shown in FIG. 1.

With reference now to FIG. 1, a multi-layer tubular braided structure is formed by means of a braiding machine 8 in which drive gears for transporting bobbin carriers are arranged as shown. FIG. 2 shows schematically six different paths A through F followed by corresponding groups of bobbin carriers transported by the gears shown in FIG. 1.

The braiding machine 8 includes a braiding ring 10 and sixteen (16) gears 12 arranged in an outer circle 14 and eight (8) gears 16 arranged along an inner circle 18. The outer and inner gear circles 14 and 18 are centered on a braiding axis 20 and are driven by gears 22 connecting the gear circles at four equally spaced points. By means of gears 22, the bobbin carriers running on outer paths can move in to inner paths and vice versa. In a manner well known in the art, the gears 12, 16 and 22 are mounted on gear supporting plates 24 which define the serpentine, intersecting pairs of tracks.

As shown in FIG. 2, the six yarn bobbin carrier group paths A to F are path A, a full circle on the outer side; path B, a full circle on the inner side; and paths C through F occupying one-quarter circles or quadrants along the inner and outer circles, the inner and outer portions of the paths C through F being joined by connecting paths associated with connecting gears 22. Quadrant paths C and E and quadrant paths D and F are positioned symmetrically about the central braiding axis 20.

The letters A to F noted on the gears of FIG. 1 correspond to the entry position of the bobbin carriers running along the paths A to F shown in FIG. 2 and the encircled letters represent that the bobbin carriers which run through the tracks, represented by the code, exist in the tracks. The bobbin carriers, designated by the circled letters, revolve in the direction of the gear having the same code. They never move to a position marked by any other code. There are a total of twenty eight (28) bobbin carriers in the braiding machine of FIGS. 1 and 2.

When braiding is formed by means of a braiding machine having six exclusive tracks as in FIGS. 1 and 2, a regularly constructed dual layer tubular braid is manufactured.

In the braiding machine shown in FIGS. 1 and 2, by placing bobbins wound with different fiber bundles into units of bobbin carrier groups respectively circulating through the two circular exclusive tracks A and B and the four exclusive quadrant tracks C to F of the above-mentioned braiding machine, the braiding takes place. For example, by placing electrically conductive fiber bundle bobbins in each of the bobbin carrier groups circulating in the circular exclusive track A, circular exclusive track B and placing non-conductive fiber bundle bobbins in each of the bobbin carrier groups, circulating in the other exclusive tracks C to F, it is possible to produce a coaxial braided cable. Further, by placing electrically conductive fiber bundle bobbins in each of the bobbin carrier groups circulating in the circular exclusive quadrant track C, circular exclusive quadrant track E and place non-conductive fiber bundle bobbins in each of the bobbin carrier groups circulating in the other exclusive tracks A, B, D and F, it is possible to fabricate a braided structure which can function as an electric cable. Furthermore, by adding bobbins carrying glass or carbon fiber bundles to the bobbin carriers circulating respectively through each of the exclusive tracks A to F, it is possible to produce a high strength braid while at the same time reducing the quantity of expensive carbon fibers used.

The type of fiber supplied longitudinally (that is, along the length of the braided structure) may be changed during the formation of the braided structure. For example, at the commencement of braiding, electrically conductive fiber bundle bobbins may be placed in each of the bobbin carrier groups circulating in the circular exclusive track B and nonconductive fiber bundle bobbins may be placed in each of the bobbin carrier groups circulating in the other exclusive tracks A and C to F. Then, at some later stage of the braiding operation, electrically conductive fiber bundle bobbins may be placed in each of the bobbin carrier groups circulating in the circular exclusive track A and nonconductive fiber bundle bobbins may be placed in each of the bobbin carrier groups circulating in the other exclusive tracks B and C to F. In this fashion, it is possible to obtain a conductive braid having electrically conductive fiber bundles exposed on selected portions of the final braided structure. Further, at each of the switchover points the conductive bundles are joined to each other.

Figure 3:
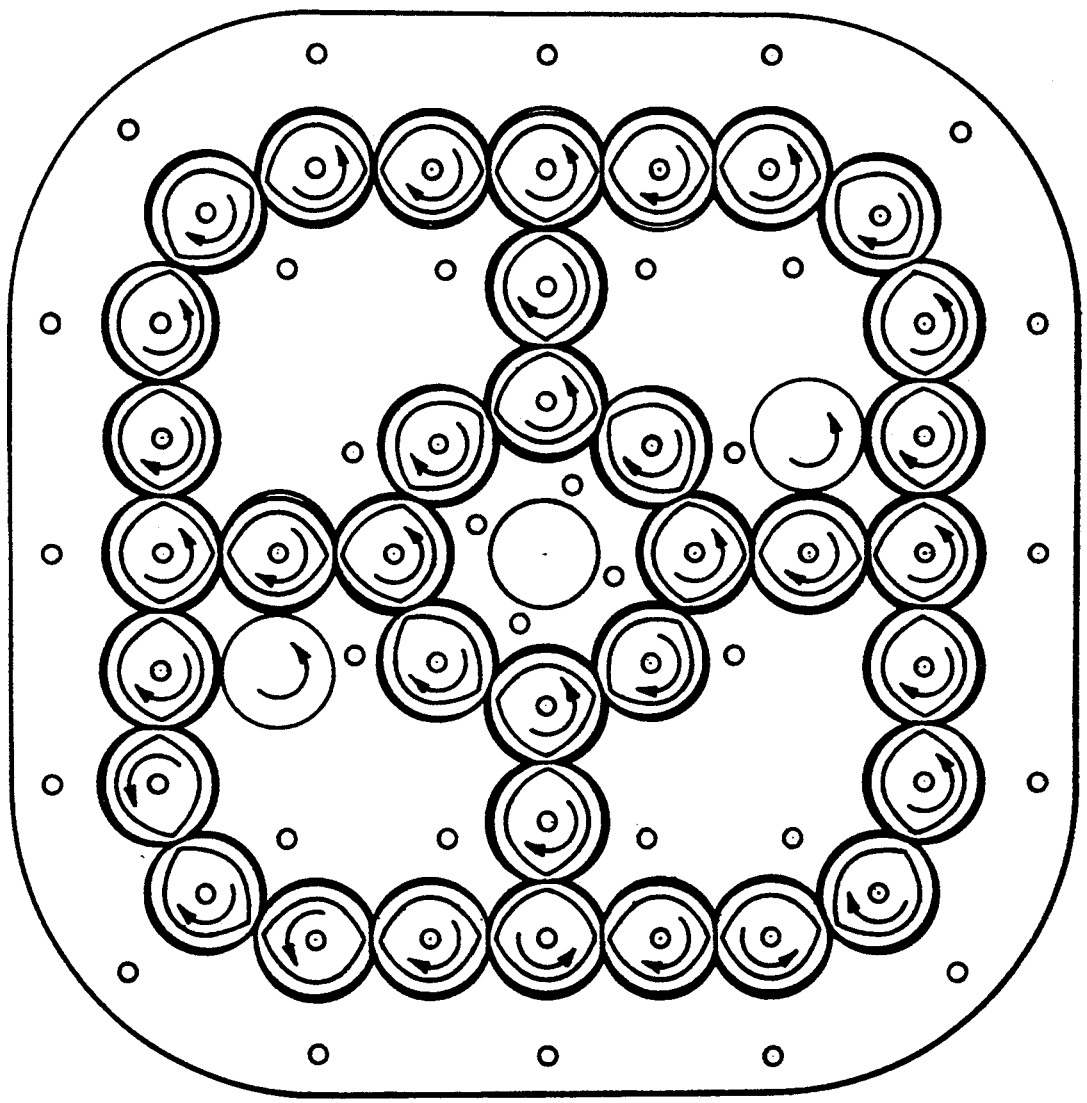
FIG. 3 is a top plan view of the track arrangement of a braiding machine in accordance with a second embodiment of the invention for forming a different multi-layer tubular braid.
Figure 4:
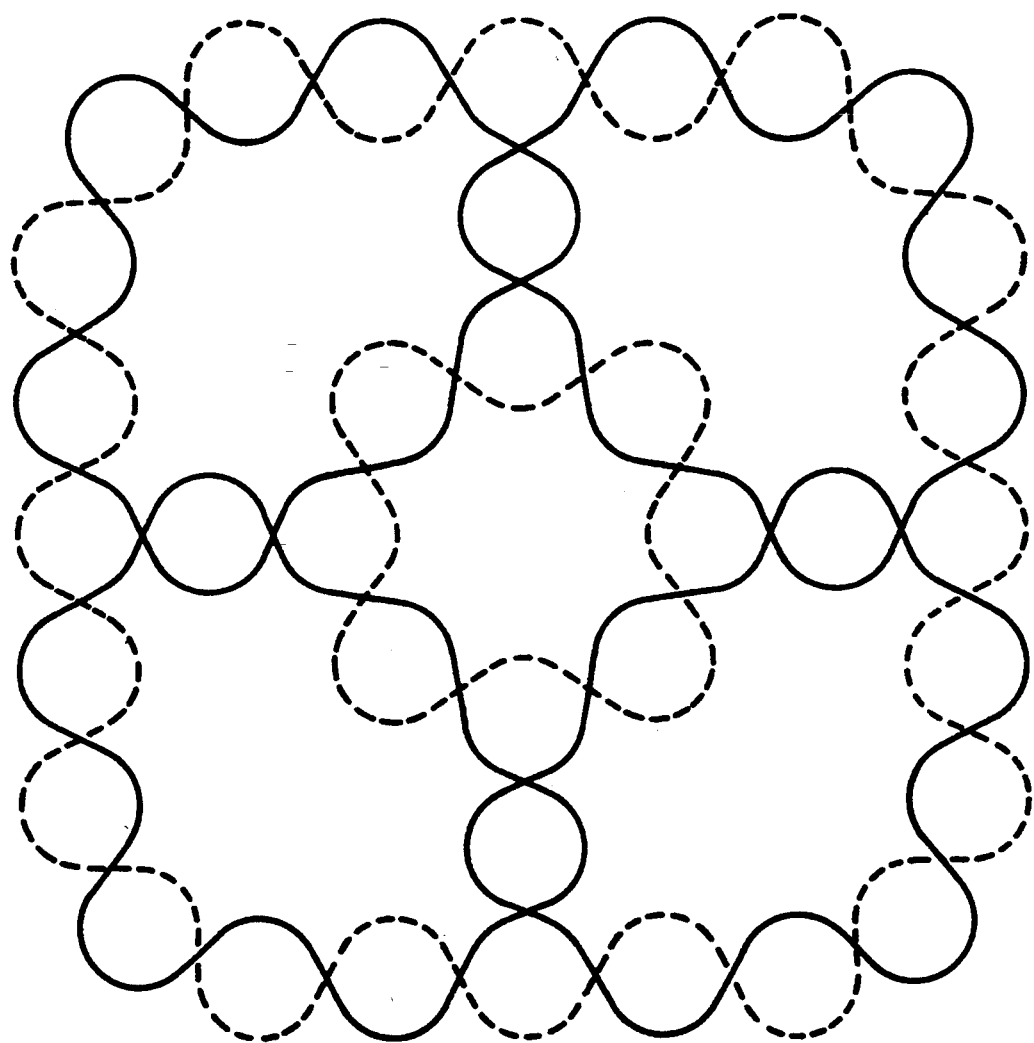
FIG. 4 is a plan view of the bobbin paths in a braiding machine having the track pattern of FIG. 3.

FIGS. 3 and 4 show braiding machine bobbin carrier tracks and paths for forming a different two layer tubular braid. This braiding machine is similar to the first embodiment in that it is a composite circular braiding machine having twenty four (24) bobbin carrier drive gears arranged along an outer circle and eight (8) meshing bobbin carrier gears along an inner circle concentric with the outer circle. The gear circles are connected by means of gears at four, equally spaced points. The embodiment of FIGS. 3 and 4 has exclusive bobbin carrier paths similar to the first embodiment, the number of bobbin carriers being thirty six (36).

Figure 5:
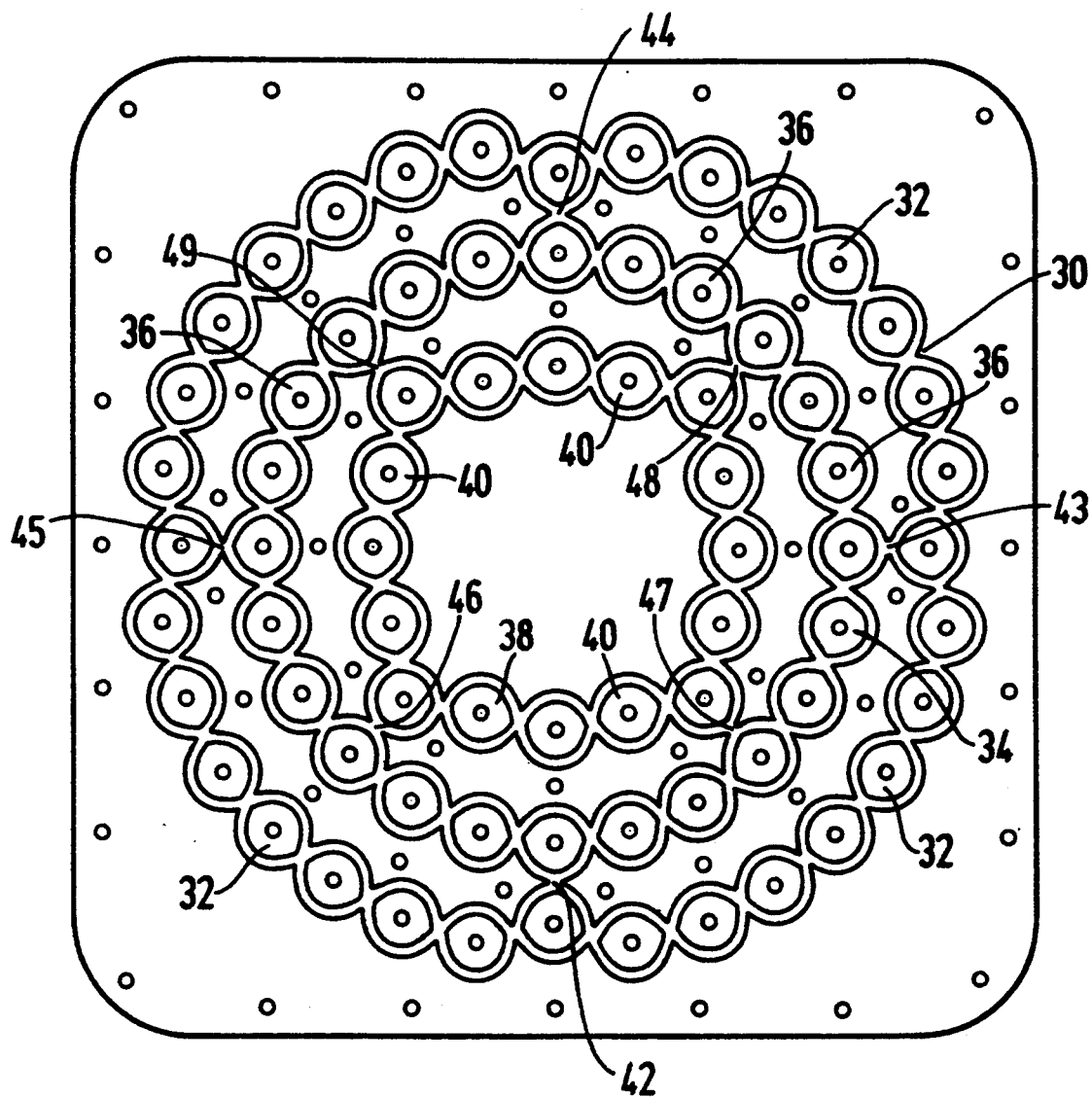
FIG. 5 is a top plan view of a bobbin carrier track pattern in accordance with a third embodiment of the invention for forming yet another multi-layer tubular braided structure.
Figure 6:
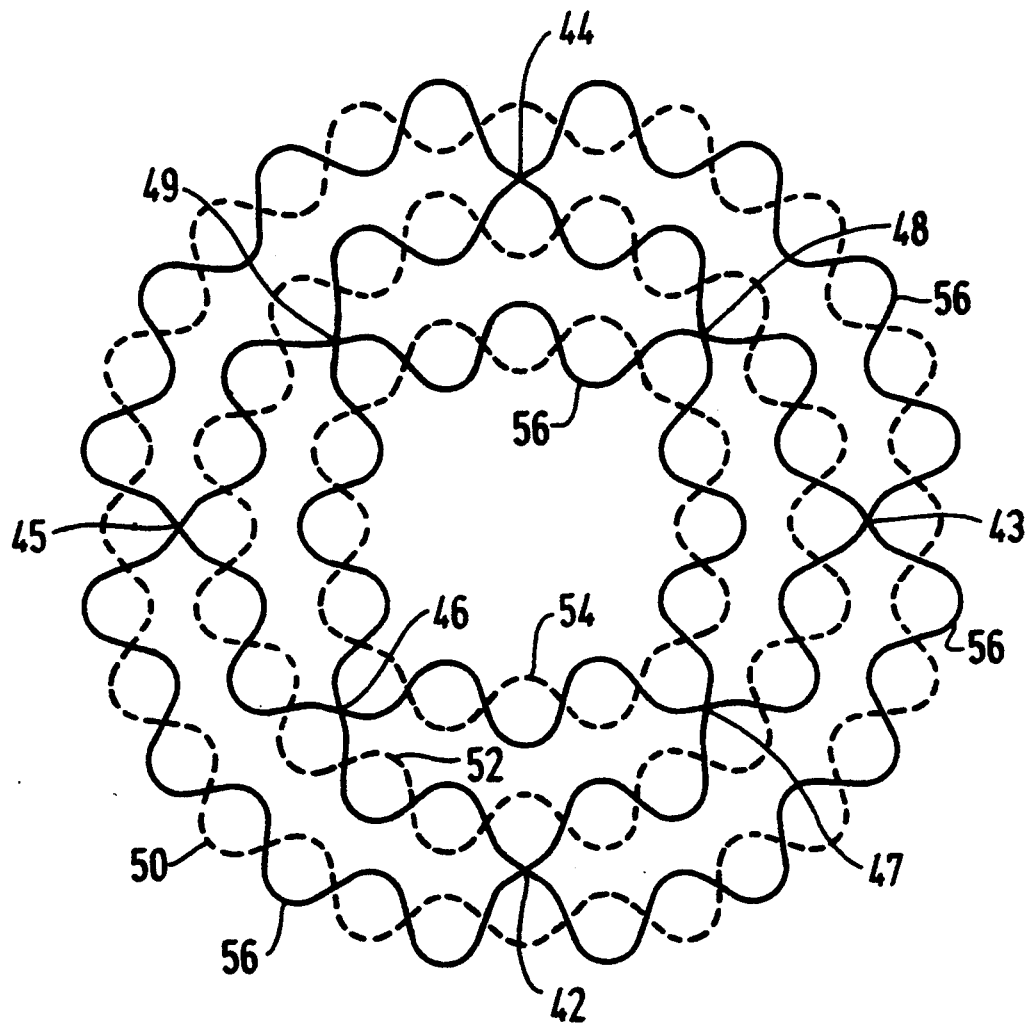
FIG. 6 is a plan view of the bobbin carrier paths in a braiding machine having the track pattern of FIG. 5.

By changing the type of bundle supplied in the latitudinal direction, and utilizing three pairs of tracks as shown in FIGS. 5 and 6, it is possible to produce a triple layer braid which employs the same basic machine.

The braiding machine of this embodiment includes in concentric circles, a track region 30, having associated therewith thirty two driving gears 32; a track region 34, which has associated therewith twenty four driving gears 36; and a track region 38 which has associated therewith sixteen driving gears 40. Each of these track regions comes into contact at crossover points 42–49 and are connected as shown in FIG. 6. The track regions include three circular exclusive tracks 50, 52 and 54 shown by the broken lines, and exclusive track 56, shown by the solid line, portions of which are in all three track regions 30, 34 and 38 and include the crossover points and in which bobbins circulate so that on the third time around, they return to their original position.

In the braid formed by this braiding machine, for example, by placing electric conductive fiber bundle bobbins in each of the bobbin carrier groups circulating in the circular exclusive track 50 and circular exclusive track 54 and placing non-conductive fiber bundle bobbins in each of the bobbin carrier groups circulating in the other exclusive tracks 52 and 56, it is possible to produce coaxial braided cable. This braid has durability at each of the extremities which is greater than the braided coaxial cable of the previous embodiment. During the formation of the braid or thereafter, it is possible to insert a filler between the walls of the braid, in which case the durability is enhanced even further. It is also effective, as part of an insertion step, to heat treat the braid with the insertion of synthetic plastic resin chips or other materials between the walls of the braid.

Further, by placing electrically conductive fiber bundle bobbins in each of the bobbin carrier groups circulating in the circular exclusive track 50 and circular exclusive track 54 and placing non-conductive fiber bundle bobbins in each of the bobbin carrier groups circulating in the other exclusive tracks 52 and 56, it is possible to produce a braid which can function as an electric cable. In either case, it is possible to obtain an electric cable having elasticity. Further, as in the previous example, it is possible to form a braid by changing the type of fiber bundle supplied in the longitudinal direction.

The foregoing explanation concentrates on electrically conductive braids but it is possible to produce braids having other functions such as insulation. Further, in general, it is also possible to develop a braid cross section having an extremely wide variety of uses.

Each of the layers of the various multiple tubular braids produced as described are closely coupled with each other and it is possible to produce a structure of high strength when glass, carbon, aramid or other fibers are used and the braid is employed as a core material for use in fiber-reinforced plastics.

In summary, it is possible with the present invention to easily produce a multi-layer tubular braid. Furthermore, when the multi-layer tubular braid which is produced is employed as a core material in fiber-reinforcing plastics, it is possible to obtain a fiber of extreme strength making it possible to broaden further the fields of use of fiber-reinforcing plastics using braids as core materials.

What is claimed is:

1. In an apparatus for producing multi-layer tubular braided structures, the combination comprising:

means defining a plurality of generally concentric pairs of serpentine, intersecting bobbin carrier-guiding tracks; and a plurality of bobbin carrier driving gear groups, each driving gear group being operatively associated with a corresponding pair of tracks, and wherein adjacent gear groups are interconnected at a plurality of bobbin carrier crossover points, in which:

a group of bobbin carriers is circulatable exclusively along one track of each pair of tracks;

a group of bobbin carriers is circulatable exclusively., via said crossover points, along at least portions of the other tracks of different pairs of tracks, the plurality of pairs of tracks comprises two pairs of tracks, said corresponding driving gear groups meshing at four equally spaced crossover points, the four crossover points define adjacent quadrants of said pairs of tracks;

a first group of bobbin carriers is circulatable exclusively along the entire length of one track of one of the pairs of tracks;

a second group of bobbin carriers is circulatable exclusively along the entire length of one track of the other of said pairs of tracks; and third, fourth, fifth and sixth groups of bobbin carriers are circulatable exclusively via said crossover points along the other tracks of said pairs of tracks within said quadrants thereof.

* * * * *